United States Patent [19]
Yamashita et al.

[11] Patent Number: 5,185,812
[45] Date of Patent: Feb. 9, 1993

[54] OPTICAL PATTERN INSPECTION SYSTEM

[75] Inventors: Kyoji Yamashita, Yokohama; Ryoichi Yoshikawa, Kawasaki; Masakazu Tokita, Fuji, all of Japan

[73] Assignees: Kabushiki Kaisha Toshiba, Kawasaki; Toshiba Machine Co., Ltd., Tokyo, both of Japan

[21] Appl. No.: 653,236

[22] Filed: Feb. 11, 1991

[30] Foreign Application Priority Data

| Feb. 14, 1990 | [JP] | Japan | 2-31485 |
| Feb. 27, 1990 | [JP] | Japan | 2-46227 |
| Nov. 30, 1990 | [JP] | Japan | 2-340333 |

[51] Int. Cl.$^5$ .................................................. G06K 9/00
[52] U.S. Cl. .......................................... 382/8; 382/18; 358/100
[58] Field of Search .............. 382/8, 18, 25; 356/237; 358/101, 106; 364/490

[56] References Cited

U.S. PATENT DOCUMENTS

| 4,148,065 | 4/1979 | Nakagawa et al. | 358/106 |
| 4,500,202 | 2/1985 | Smyth | 382/8 |
| 4,532,650 | 7/1985 | Wihl et al. | 358/106 |
| 4,547,895 | 10/1985 | Mita et al. | 382/8 |
| 4,661,984 | 4/1987 | Bentley | 382/8 |
| 4,776,023 | 10/1988 | Hamada et al. | 382/8 |
| 4,860,371 | 8/1989 | Matsuyama et al. | 382/8 |
| 4,985,374 | 9/1990 | Tokita et al. | 382/8 |

Primary Examiner—David K. Moore
Assistant Examiner—Barry S. Stellrecht
Attorney, Agent, or Firm—Oblon, Spivak, McClelland, Maier & Neustadt

[57] ABSTRACT

A pattern inspection apparatus comprises a sensor data input section for inputting a two-dimensional inspected pattern as image data (sensor data) having a multivalued (non-binary) density distribution, design data input section for inputting reference pattern data (reference data) corresponding to the inspected pattern, a compare section for making a comparison between the image data and the reference data to obtain the difference in density therebeween, a minimum compare section for performing spatial differentiation filtering on the distribution of density between the inspected pattern and the reference pattern in different directions and obtaining the minimum of the absolute values of the filtered outputs, and a first defect determining section for detecting a defect on the basis of the minimum obtained by the compare section. In place of the first defect determining section, a maximum/minimum compare section for obtaining the minimum and maximum of the absolute values of the filtered outputs and a second defect determining section for detecting a defect on the basis of the density difference, the minimum and the maximum may be provided.

10 Claims, 20 Drawing Sheets

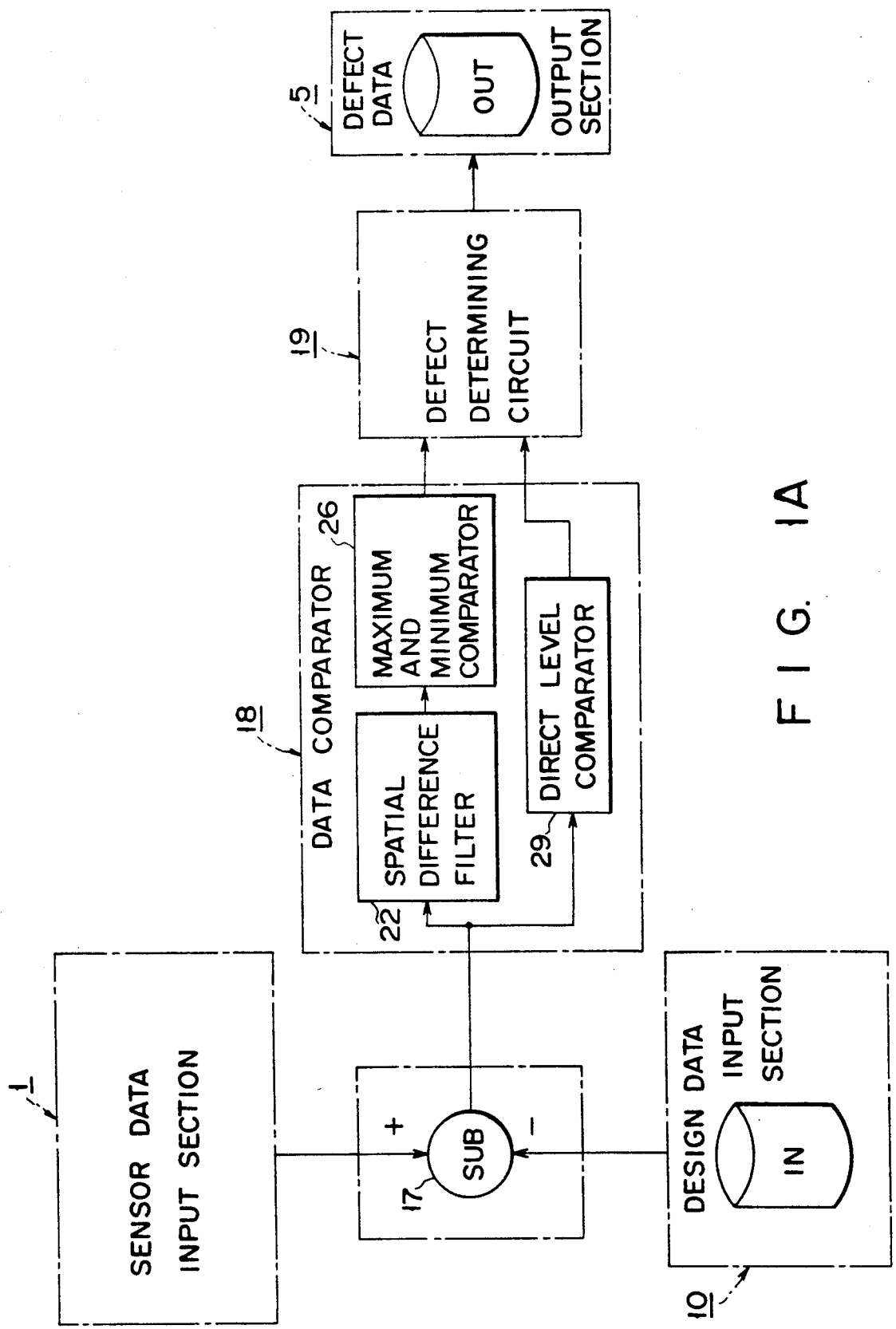
F I G. IA

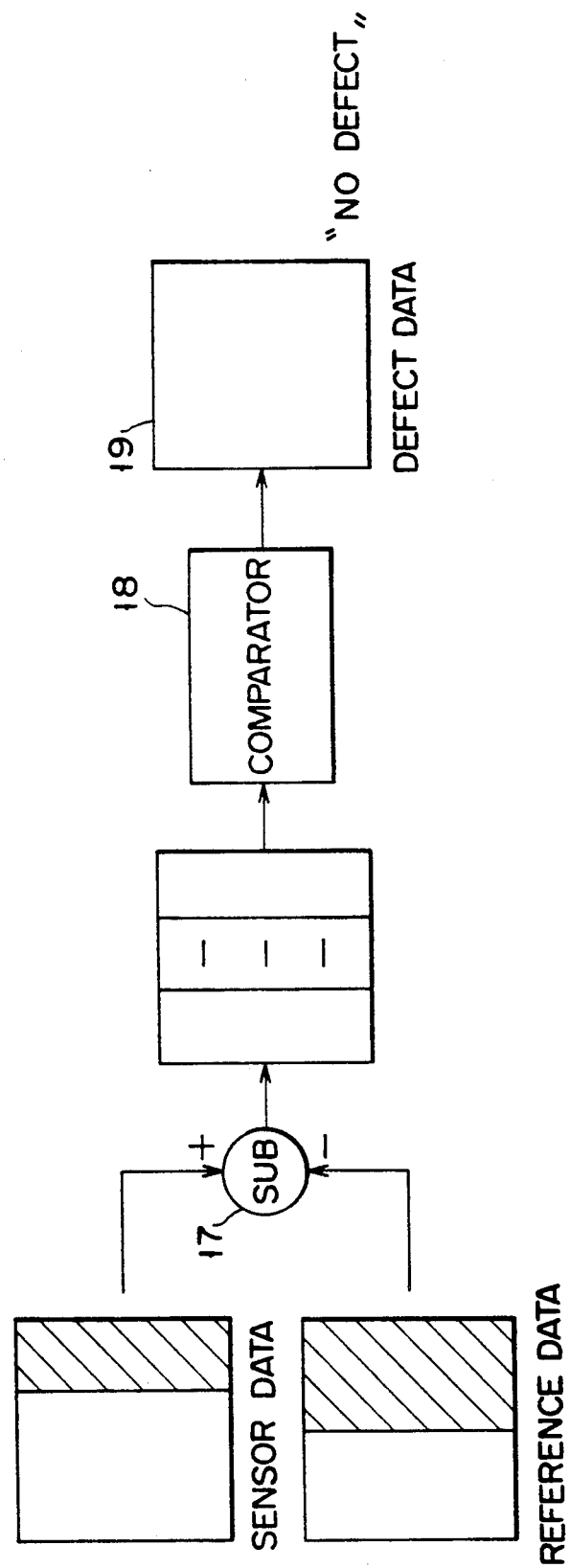
F I G. 12B

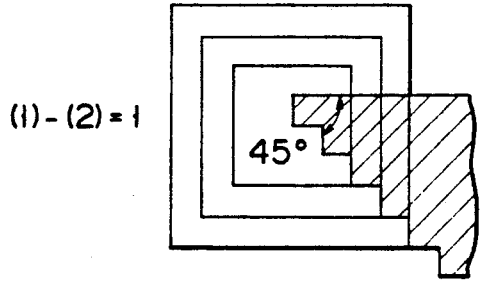
FIG. 14A
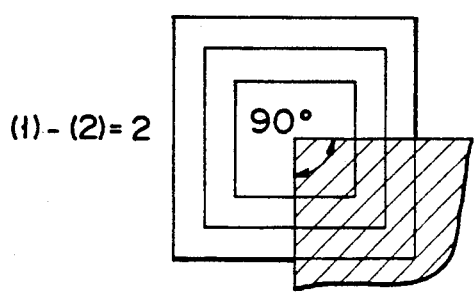
FIG. 14B
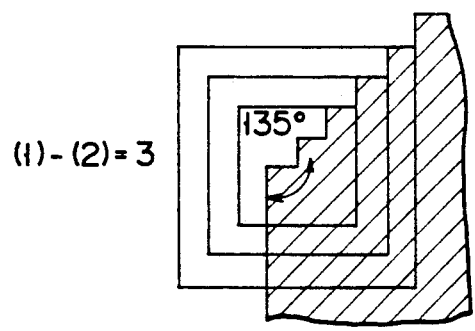
FIG. 14C
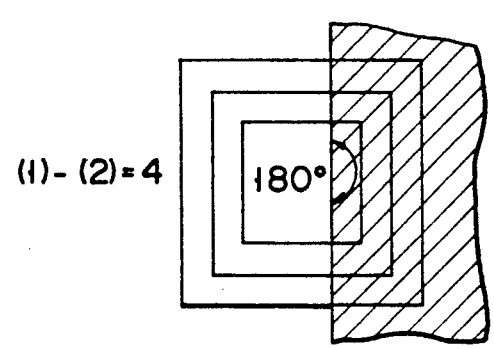
FIG. 14D
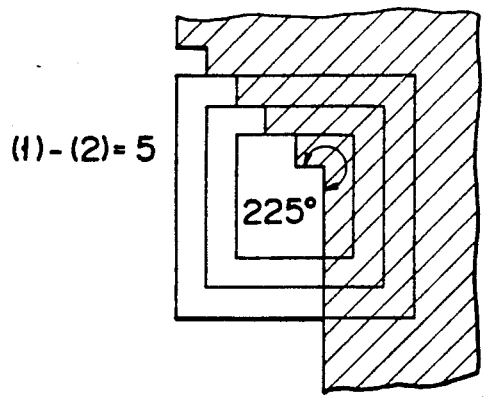
FIG. 14E
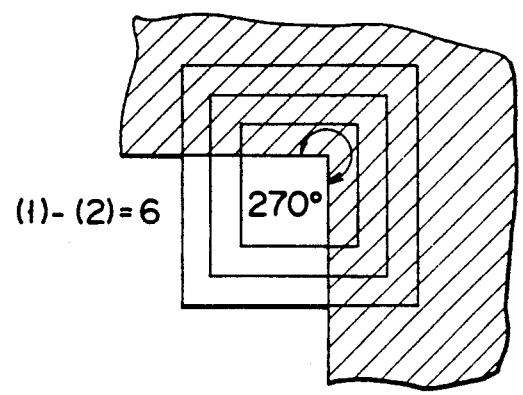
FIG. 14F
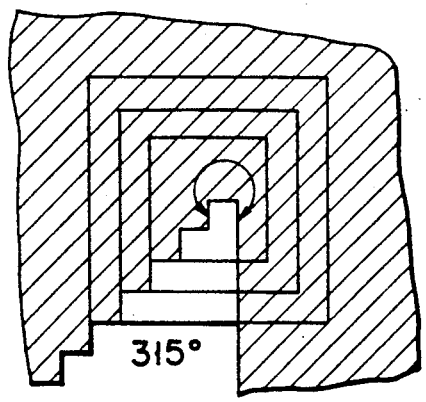
FIG. 14G
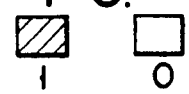

OPTICAL PATTERN INSPECTION SYSTEM

BACKGROUND OF THE INVENTION

1. Field of the Invention

The present invention relates to a pattern inspection system which is used to inspect defects of a pattern drawn on a mask, a semiconductor integrated circuit pattern in particular, and has a pattern feature extraction function for extracting the feature of a circuit pattern.

2. Description of the Related Art

Heretofore, such a type of pattern inspection system chiefly adopts a way of pattern inspection which makes a comparison between image data obtained by taking the image of an inspected pattern with an image sensor and reference pattern data made from design patter data and detects points at which data comparison indicates no equality as defects. This type of inspection, which is more reliable than a die to die comparison method which makes a comparison between adjacent two inspected patterns, has a drawback (misalignment) that errors in line width and the roundness of corners of an inspected circuit pattern which result from resist processes and misregistration between a table adapted for mechanical scanning of the inspected circuit pattern and a reference circuit pattern can also be detected as defects.

This type of inspection is generally required to detect defects of the size of 1/5 to ⅓ of the minimum line width of a semiconductor integrated circuit. As the packing density of a semiconductor integrated circuit increases, the minimum line width of a circuit pattern becomes increasingly small. The size of 1/5 to ⅓ of the minimum line width is close to the optical resolution. It is therefore difficult to obtain a high-contrast image (image data).

To solve the above problems, an approach is disclosed in Japanese Unexamined Patent Publication No. 62-266406, which obtains a gradient vector of each of an inspected pattern and a reference pattern and makes a comparison between the absolute value of 3×3 surface shape of the both portion. However, this approach cannot separate signals used for defect inspection into a signal resulting from misregistration and a signal resulting from a defect. Thus, there is the possibility of false defect detection due to misregistration.

The conventional type of defect inspection is more reliable than a type which makes no reference to a design pattern but has a drawback that dimensional errors due to rounded corners of a circuit pattern and thinning or fattening of line widths and a positioning error of an examination table can also be detected as defects.

To solve the drawback, a method may be devised which extracts the pattern features of a circuit pattern, such as its edges and corners, and changes a defect detecting algorithm in accordance with extracted features (for example, processing parameters are changed). As an example of the method, there is a template matching method, according to which a very large amount of calculations must be performed when picture elements of an integrated circuit increase in number. It is difficult to perform the calculations at a high speed. It is very difficult to match templates, which are provided for all edges and corners of a circuit pattern in four directions, for example, 0°, 45°, 90° and 135° directions, against the circuit pattern for each picture element in real time (within the time it takes to inspect the circuit pattern).

As described above, the conventional system adapted to optically inspect defects of a semiconductor circuit pattern has a problem that a dimensional error due to photoresist process for producing a circuit pattern and a positioning error due to misregistration between an inspected pattern (a sensor pattern) and a reference pattern can be detected as defects.

SUMMARY OF THE INVENTION

It is an object of the present invention to provide a pattern inspection system which permits only defects on a circuit pattern to be detected efficiently without false defect detection due to a resist process and misregistration and, more particularly, to a pattern inspection apparatus which is equipped with a pattern feature extracting function which permits extraction of features of a circuit pattern including edges and corners to be performed at a high speed using simple arithmetic processing and the efficiency of pattern defect detection to be increased.

To attain the above object, a pattern inspection system of the invention comprises a sensor data input section for inputting a two-dimensional inspected pattern as image data (sensor data) having a multivalued (non-binary) density distribution, design data input section for inputting reference pattern data (reference data) corresponding to the inspected pattern, a compare section for making a comparison between the image data and the reference data to obtain the difference in density therebetween, a minimum compare section for performing spatial differentiation filtering on the distribution of density difference between the inspected pattern and the reference pattern in different directions and obtaining the minimum of the absolute values of the filtered outputs, and a defect determining section for detecting a defect on the basis of the minimum obtained by the compare section.

The pattern inspection system may be provided with a maximum/minimum compare section for obtaining the minimum and maximum of the absolute values of the filtered outputs and a defect determining section for detecting a defect on the basis of the density difference, the minimum and the maximum.

The present invention is provided with a pattern extracting section which permits the feature of a circuit pattern, such as an edge or corner, to be extracted at a high speed using simple arithmetic processing. More specifically, the pattern extracting section comprises a memory for storing a window region of a predetermined shape (for example, a rectangle, in particular, of polygons) cut from design data for producing a pattern or image data obtained by taking the image of the pattern, counters for dividing the window region stored in the memory into plural subregions (for example, ring-like subregions) and calculating the sum of gray levels of picture elements contained in the subregions, a comparator for making a comparison in the sum of gray levels between the subregions and a classifying section for classifying the pattern feature of the window region o the basis of the results of comparison.

In the present invention, only spatial differentiation filtering of the distribution of density difference between the inspected pattern and the reference pattern in different directions and detecting the minimum of the absolute values of the filtered outputs allow a defect to be detected readily because the minimum varies with the defect.

In addition, in the present invention, not only data on the density difference between the inspected pattern and the reference pattern but also the minimum and maximum resulting from spatial differentiation filtering in different directions are obtained. Although the density difference, the minimum and maximum each vary with a defect and misregistration, there is a difference in amount of variation between defect and misregistration. Specifically, the density difference varies greatly according to a large defect, the minimum according to a small defect and the maximum according to misregistration (misregistration exceeding an allowable range). Therefore, the pattern inspection based on the density difference, minimum and maximum permits only defects to be detected without causing false detection due to misregistration.

Furthermore, in the present invention, the difference in the sum of gray levels between subregions (for example, ring-like regions) into which a window region of an arbitrary shape (for example, a rectangle, in particular, of polygons) is used as a measure of the feature of a pattern. The difference will not vary with parallel displacement or rotary displacement of a circuit pattern but vary with processed shapes of edges and corners of the circuit pattern. Therefore, the pattern feature of a circuit pattern, such as edges and corners, attendant on shape processing can be extracted and detected without using the parallel displacement or rotary displacement of the circuit pattern.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A is a functional block diagram of a pattern inspection system according to an embodiment of the present invention;

FIGS. 6A to 6E, FIGS. 7A to 7E and FIGS. 8A to 8E are diagrams illustrating the distribution of data when defects and misregistration exist;

FIGS. 12A and 12B are diagrams for use in explanation of the operation of the apparatus of FIG. 9;

FIGS. 14A through 14G are diagrams for use in explanation of the principle of the pattern feature extraction when the circuit pattern is divided into two ring-like regions.

DETAILED DESCRIPTION OF THE PREFERRED EMBODIMENTS

Figure 1B:
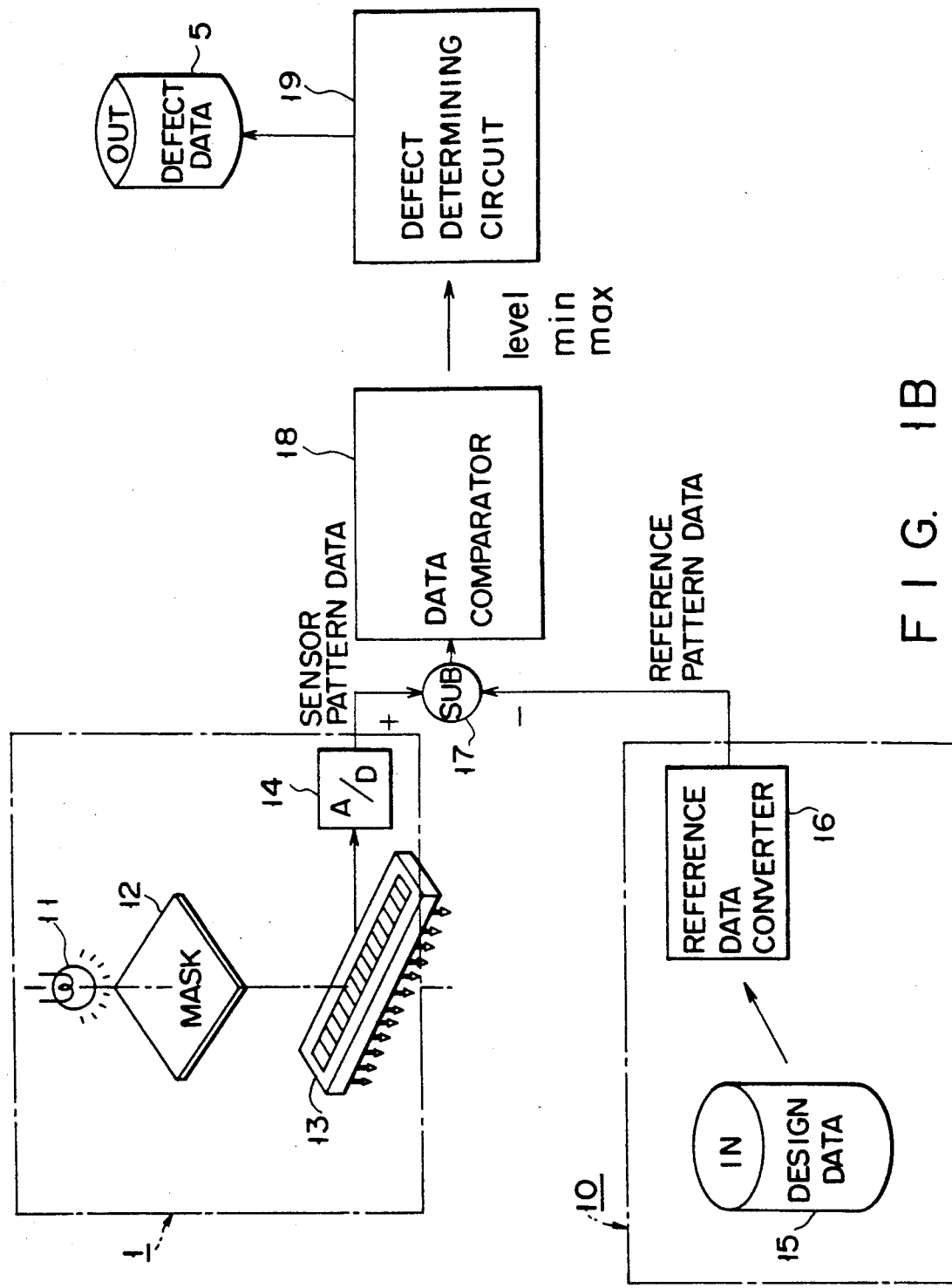
FIG. 1B is schematic representation of the pattern inspection system of the present invention.

As illustrated in FIG. 1A, a pattern inspection system according to an embodiment of the present invention comprises the following functional blocks.

That is, input data sources for pattern inspection comprise a sensor data input section 1 which generates multivalued image data (e.g., sensor data) representing the distribution of density of a two-dimensional inspected pattern obtained by a visual sensor (not shown) and a design pattern data input section 10 which holds reference pattern data representing a typical pattern of a circuit pattern on, for example, a magnetic disk. The sensor data resulting from processing of the inspected pattern in the sensor data input section 1 is applied to an arithmetic unit 17. Data corresponding to the sensor data is retrieved from the reference data file and then applied to the arithmetic unit 17. The arithmetic unit 17 subtracts the reference data from the sensor data to obtain the difference between the two pieces of input data.

The difference data between the sensor data and the reference data is applied to a data comparator 18. In the circuit 18, the difference data is first applied to the data comparator 18 which makes a comparison between the two pieces of data to obtain the density difference (absolute value) between the inspected pattern and the reference pattern. A spatial differentiation filter 22 is provided to the corresponding difference direction of the density difference between the inspected pattern and the reference pattern. The minimum/maximum of the absolute value is obtained by a minimum/maximum comparator 26.

The data comparator 18 is provided with a direct level comparator 29 in a separate circuit, which can be used, as required, to obtain the absolute value of the difference data without performing the above-described data processing.

The output of the data comparator 18 is applied to a defect determining circuit 19 which can detects pattern defects on the basis of said obtained minimum and maximum density. The defect determining circuit 19 may be a minimum comparator for obtaining the minimum of the absolute values or defect determining circuit for detecting defects on the basis of the minimum.

The data on defects of the pattern thus obtained is stored in a defect data output section 5 having a magnetic file and used as input data for subsequent process of modifying the defective pattern.

In FIG. 1B, which is a schematic illustration of the pattern inspection apparatus of the present invention, 11 denotes a light source, 12 denotes a mask on which a circuit pattern is drawn and 13 denotes a one-dimensional image sensor The mask 12 is illuminated by the light source 11 and the image sensor 13 detects light transmitted through the mask, thereby obtaining image data of the inspected pattern. The image data is converted to a multivalued digital signal by an A/D converter 14 (that is, the density of the pattern is multi-digitized. The mask 1 is moved in the direction normal to the direction in which photodetector elements of the sensor 13 are arranged photodetector by photodetector in position, whereby the entire pattern is scanned. Although not shown for the purpose of simplifying the description, the inspected pattern is projected enlarged onto the sensor 13 by a microscopic optical system.

On the other hand, binary dot pattern data of 1s and 0s resulting from expansion of design pattern data (e.g., CAD data) previously stored in a magnetic disk 15 is applied as input data to a data converter 16. The data converter 16 performs the convolution integral of a point spread function equivalent to the optical system and the input data to produce multivalued reference pattern data used for comparison as is the case with the inspected pattern. Where identical patterns are arranged on a mask and a comparison is made between adjacent inspected patterns on a die-to-die basis, the images of the adjacent inspected patterns may be taken as an alternative means for obtaining reference pattern data.

Subtraction is performed by the arithmetic unit 17 by subtracting the reference pattern data (design pattern) from the image data (inspected pattern) and the resultant difference is applied to the comparator 18. The comparator 18 is provided with a spatial differentiation filter as described later and obtains the minimum and maximum of the difference between the inspected pattern and the design pattern (absolute value of the density difference) and signals passing through the filter. The output of the comparator 18 is applied to the defect determining circuit 19 which, when at least one of the absolute value of the density difference, the minimum and the maximum exceeds its corresponding threshold, is adapted to determine a defect. The size of a defect to be detected can be changed by changing the threshold.

Figure 2:
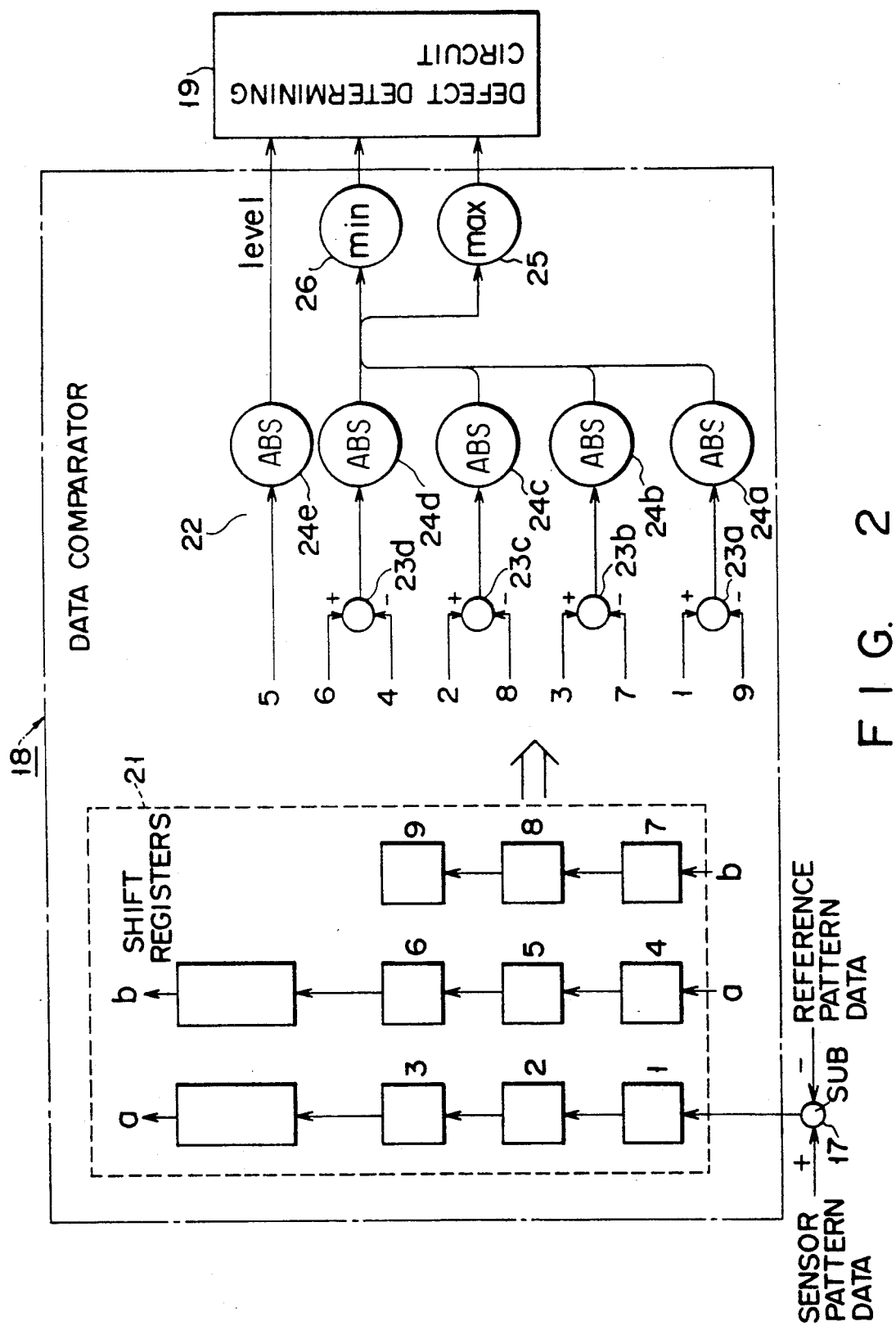
FIG. 2 illustrates a specific arrangement of the comparator used in the pattern inspection system.

FIG. 2 is a specific block diagram of the comparator 18. The input data (density difference) to the comparator 18 is applied to a shift register 21. The shift register 21 has cells which correspond in number to twice the picture elements of the sensor 13 plus three. A portion of 3×3 picture elements (indicated by dotted lines) is coupled to the spatial differentiation filter 22. The spatial differentiation filter 22 is adapted to perform a filtering process on the portion of 3×3 picture elements in four directions of angles of multiples of 45 degrees and comprises four subtracters 23a to 23d and absolute-value detectors 24a to 24e. The four directions correspond to the directions of vertical, horizontal and diagonal 45-degree edges of the circuit pattern.

The 3×3 cell data is processed by the spatial differentiation filter 22 in the following manner. That is, of the cells 1 to 9 of the shift register centered at the cell 5 pairs of cells 1 and 9, cells 3 and 7, cells 2 and 8 and cells of 4 and 6 are coupled to the subtracters 23a, 23b, 23c and 23d, respectively. The outputs of the subtracters 23a to 23d are applied to the absolute-value detectors 24a to 24d to obtain their respective absolute values (indicated by abs). The maximum (indicated by max) and minimum (indicated by min) of the four absolute values are detected by a maximum detector 25 and a minimum detector 26, respectively, and then applied to the defect determining circuit 19. The absolute value of data (density difference) from the cell 5 is also applied to the defect determining circuit 19.

Figure 3:
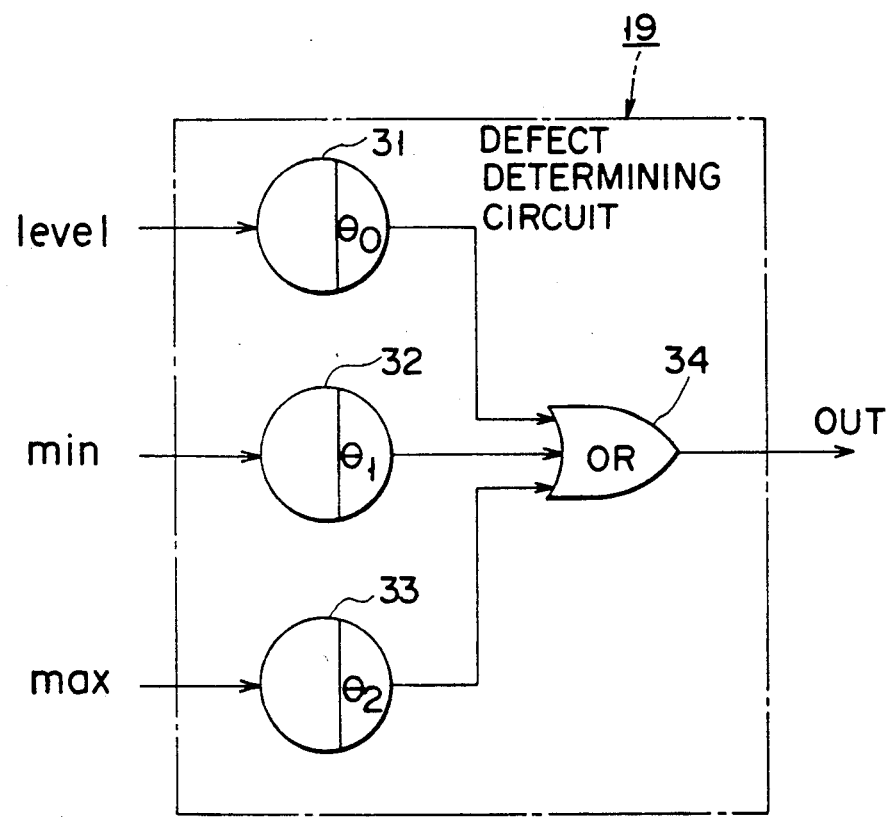
FIG. 3 illustrates a specific arrangement of the defect decision circuit used in the pattern inspection system.

FIG. 3 illustrates a specific arrangement of the defect determining circuit 19, which comprises three comparators 31, 32 and 33 having their respective thresholds ($\theta 0$, $\theta 1$, $\theta 2$) and a three-input OR gate 34 connected to the outputs of the comparators. When at least one of the absolute values of the density difference, the minimum and the maximum exceeds its corresponding threshold, the OR gate 34 produces a 1 output whereby it is determined that the inspected pattern is defective.

Figure 4:
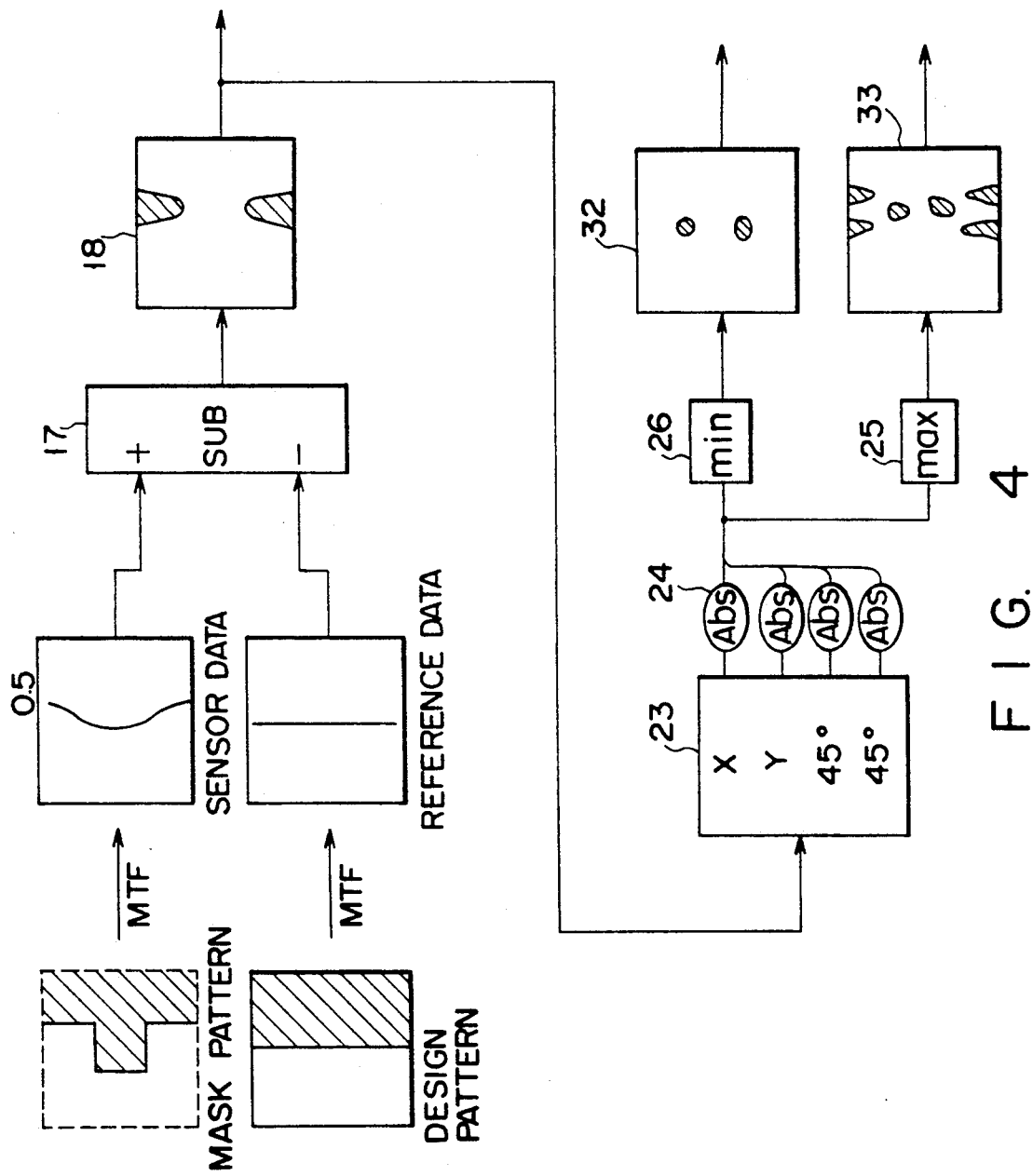
FIGS. 4 and 5 are diagrams for use in explanation of the operation of the pattern inspection system.
Figure 5:
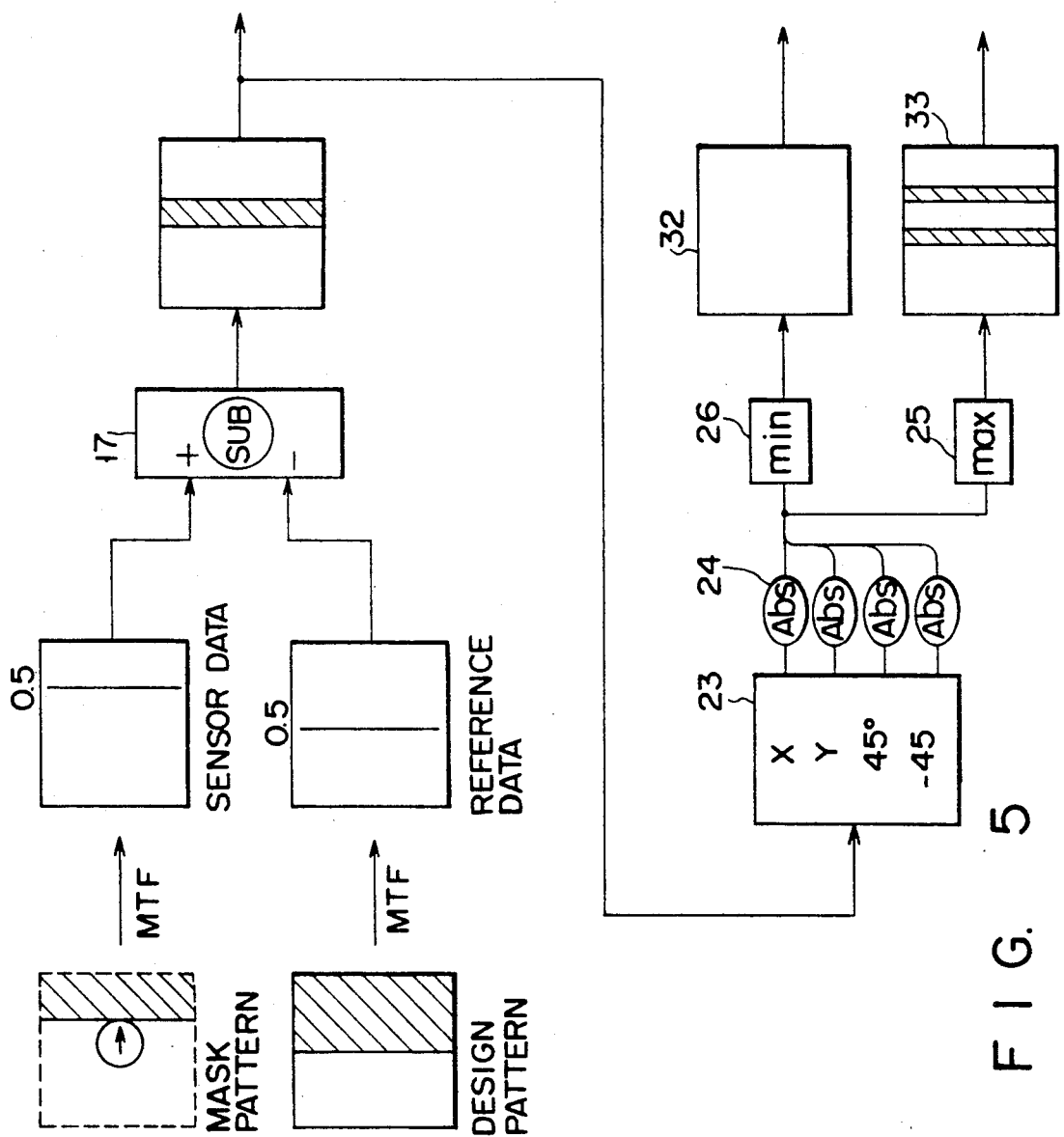

FIGS. 4 and 5 are schematic representations of the manner in which a defect is detected by the present apparatus. When there is a defect in an inspected pattern as illustrated in FIG. 4, data obtained from the subtracter (SUB) 17 contains information corresponding to the defect. Moreover, minimum and maximum data obtained by transmitting the density difference data through the spatial differentiation filter also contain information corresponding to the defect.

When there is misregistration in the inspected pattern as illustrated in FIG. 5, data obtained from the subtracter (SUB) 17 contains information corresponding to the misregistration. The maximum data obtained by transmitting density difference data through the spatial differentiation filter also contains information corresponding to the misregistration. However, the minimum data contains no information corresponding to the misregistration.

The mask data represents a pattern to be inspected and is specifically represented in terms of optical quantity (for example, light transmittance).

Figures 6A, 6B, 6C:
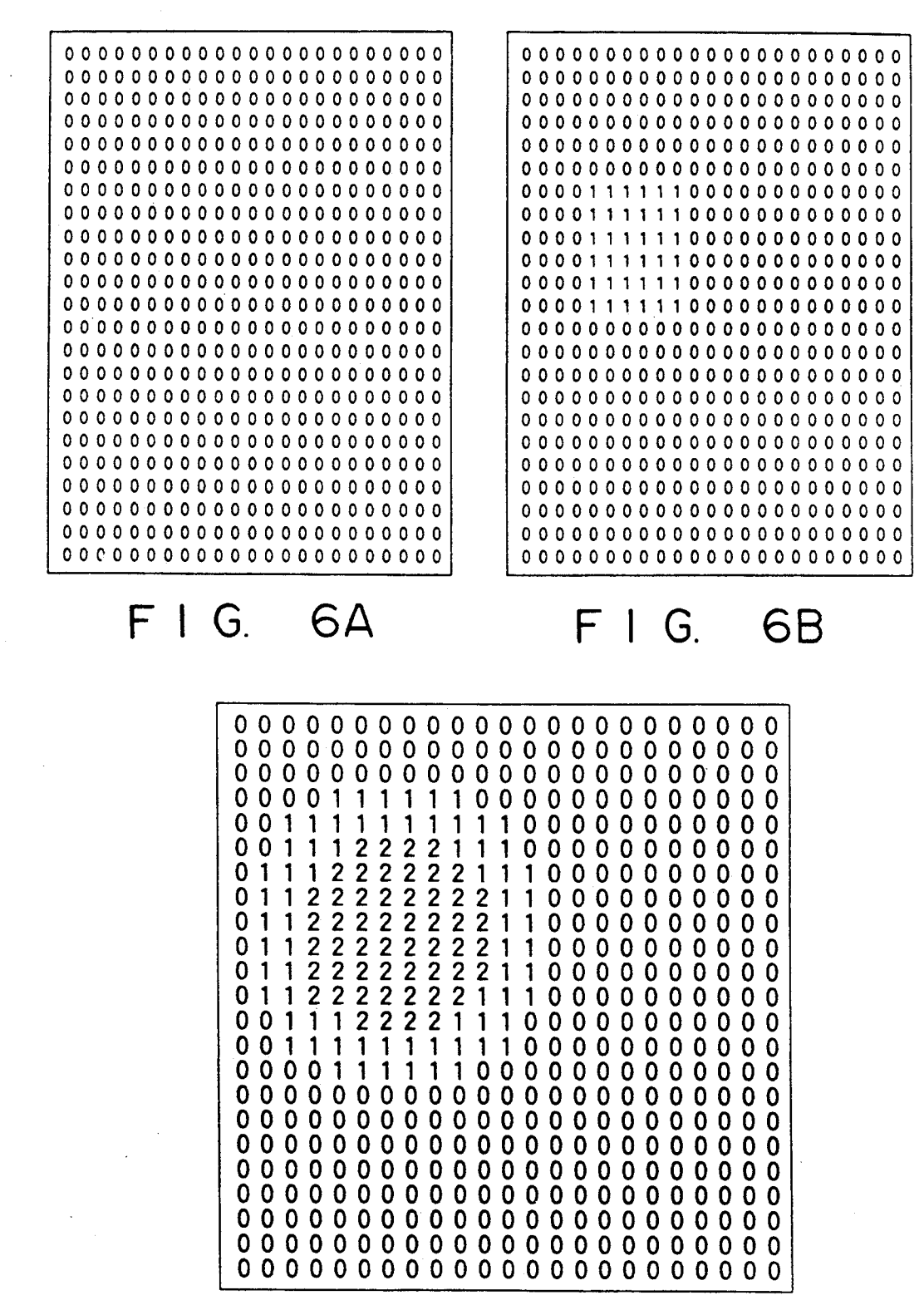
Figures 6D, 6E:
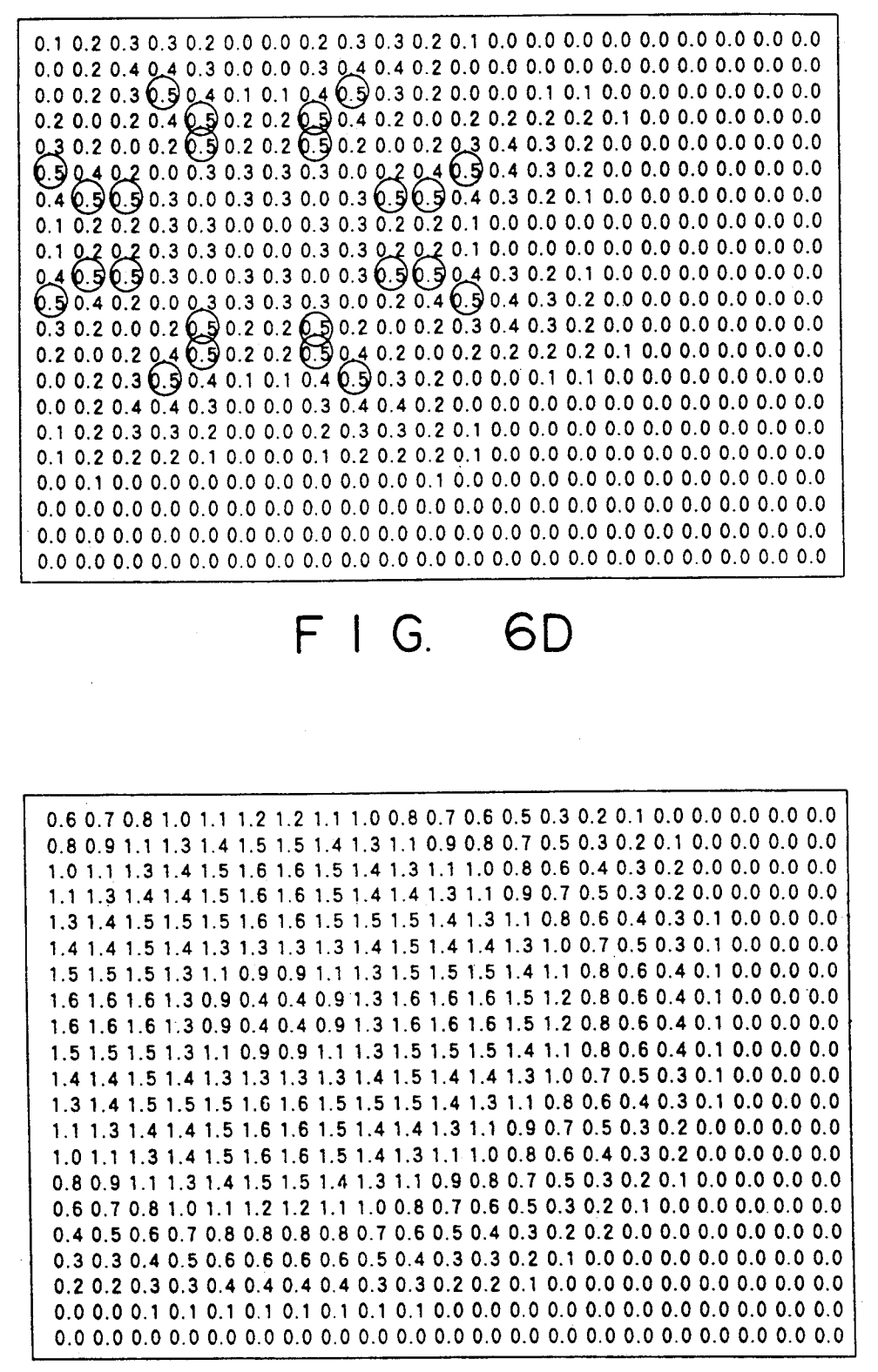

FIG. 6A illustrates a dot pattern equivalent to design pattern data and FIG. 6B illustrates a dot pattern equivalent to mask data for an isolated defect (size 6×6). The above data is binary, while image data (inspected pattern) and reference pattern data are multivalued data with density distribution. FIG. 6C illustrates the difference between the image data and the reference pattern data (density difference), FIG. 6D illustrates minimums obtained in the present embodiment and FIG. 6E illustrates maximums. In the case of such a defect, any data contains defect information as illustrated in FIGS. 6C, 6D and 6E.

Likewise, FIGS. 7A to 7E illustrate dot patterns containing only misregistration (size 3), while FIGS. 8A to 8E illustrate dot patterns containing a defect and misregistration.

The difference between the image data and the reference pattern data is obtained by the convolution integral of the difference between the inspected pattern and the dot pattern equivalent to the design pattern and the point spread function equivalent to the optical system mentioned above. Thus, the difference will become 0 when neither of misregistration and a defect is involved.

Figures 7A, 7B, 7C:
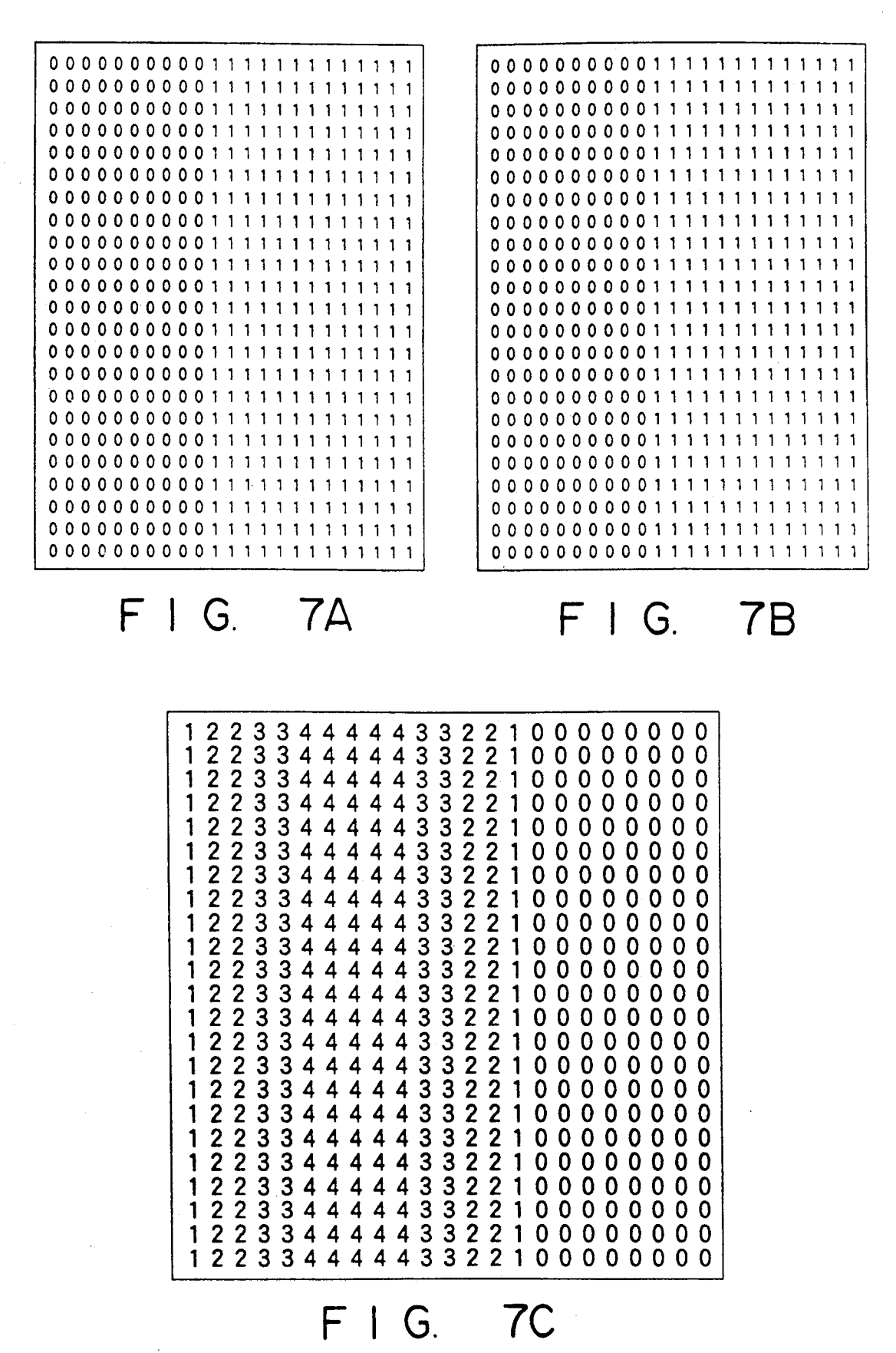
Figures 7D, 7E:
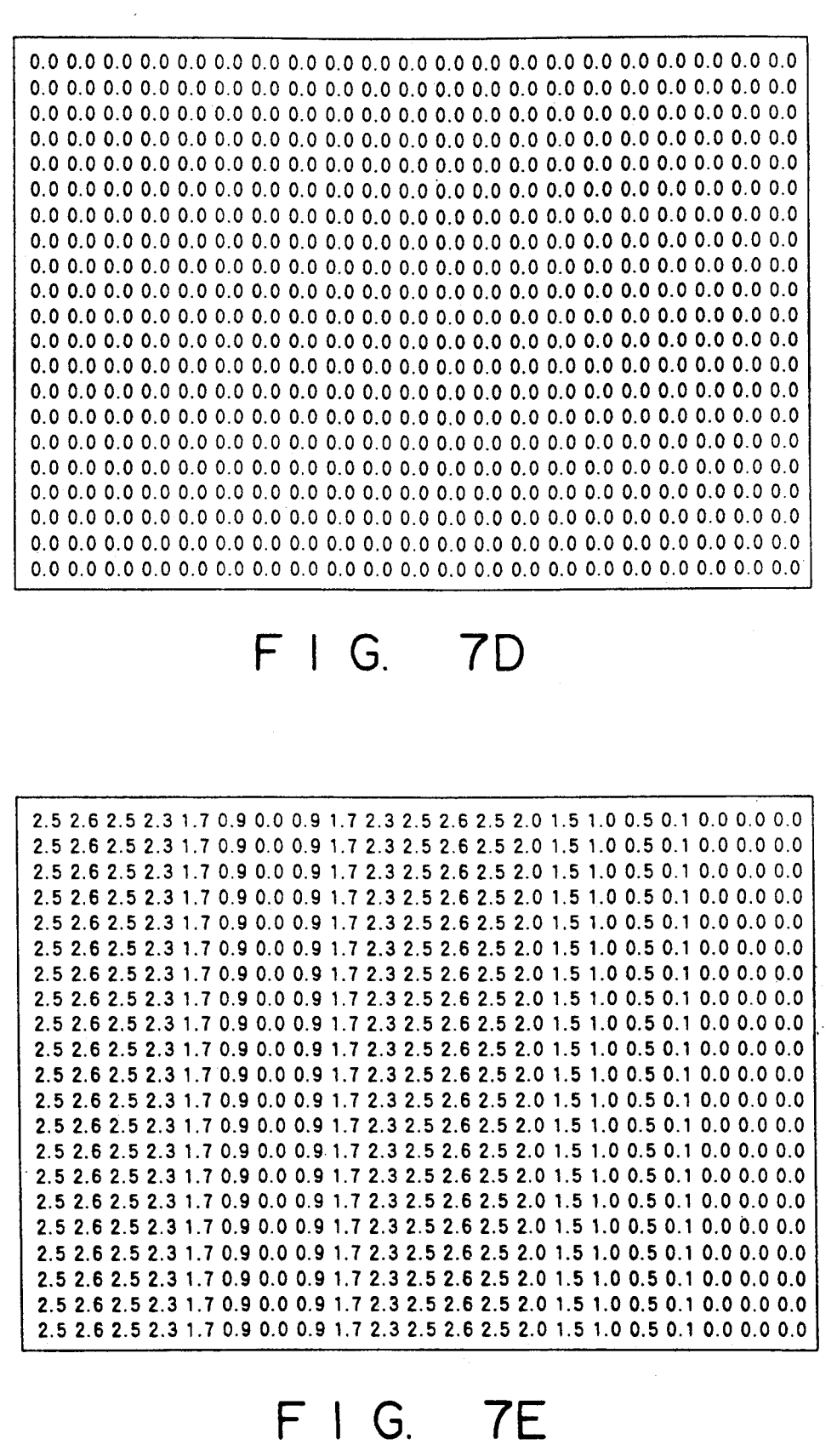
Figures 8A, 8B, 8C:
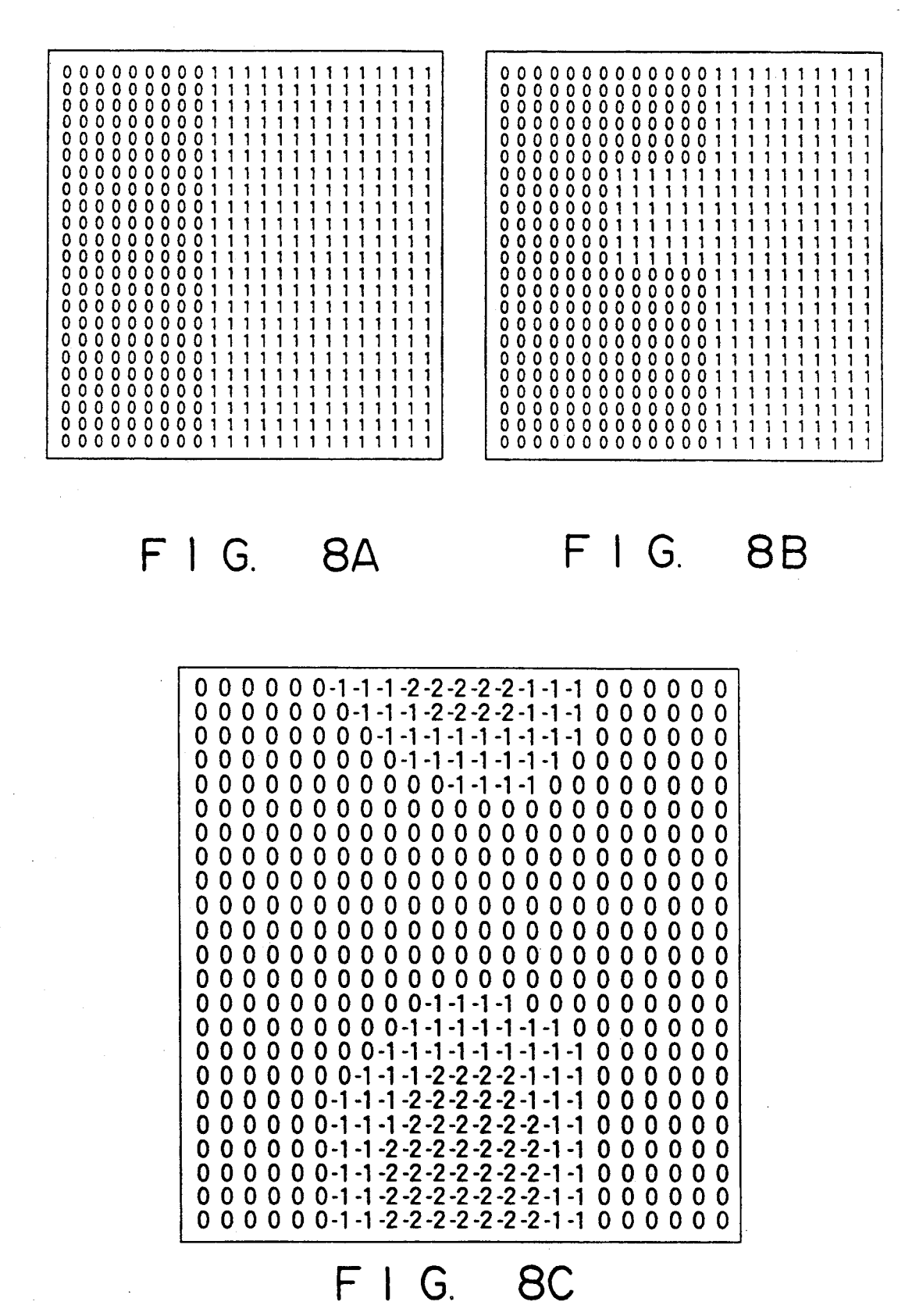
Figures 8D, 8E:
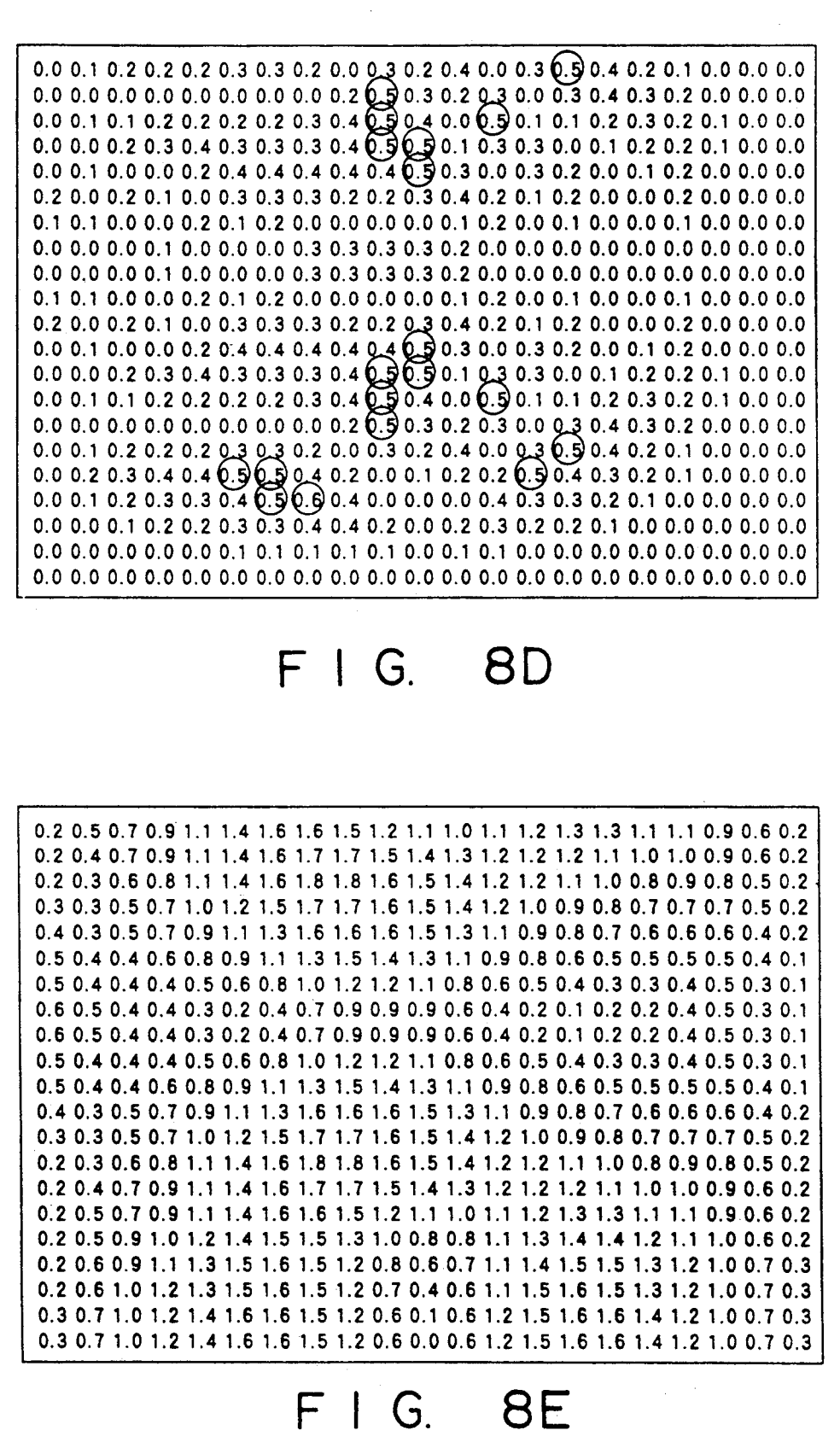

If the thresholds for defect determination are set to, for example, 5 for the density difference, 0.5 for the minimum and 2.3 for the maximum, then it will determined that defects exist (indicated surrounded by circles) only when there are defects. A comparison between FIGS. 7D and 8D shows that the minimum is 0 (i.e., the gray level is at a minimum) for all picture elements when only the former misregistration exists, while the minimum is not 0 (i.e., the gray level is at a minimum or more) when the latter defects exist. It will thus be seen that the determination of the presence or absence of defects based on the minimum values is advantageous.

According to the present embodiment, the inspection of defects is made on the basis of not only data on density difference between an inspected pattern and a reference pattern but also minimum and maximum values obtained by spatial differentiation filtering in different directions. A threshold is set to each of the density difference, the minimum and the maximum and it is determined that a defect exists when one of the density difference, the minimum and the maximum exceeds its corresponding threshold. Therefore, false detection due to small misregistration can be prevented and only defects can be detected efficiently. More specifically, a large defect can be detected on the basis of the absolute value of the density difference, a small defect can be detected on the basis of the minimum and large misregistration exceeding an allowable range can be detected on the basis of the maximum. In other words, defects and misregistration can be detected individually, and only a substantial defective pattern of an object of inspection can be detected without causing false detection due to a resist process and misregistration.

Figure 9:
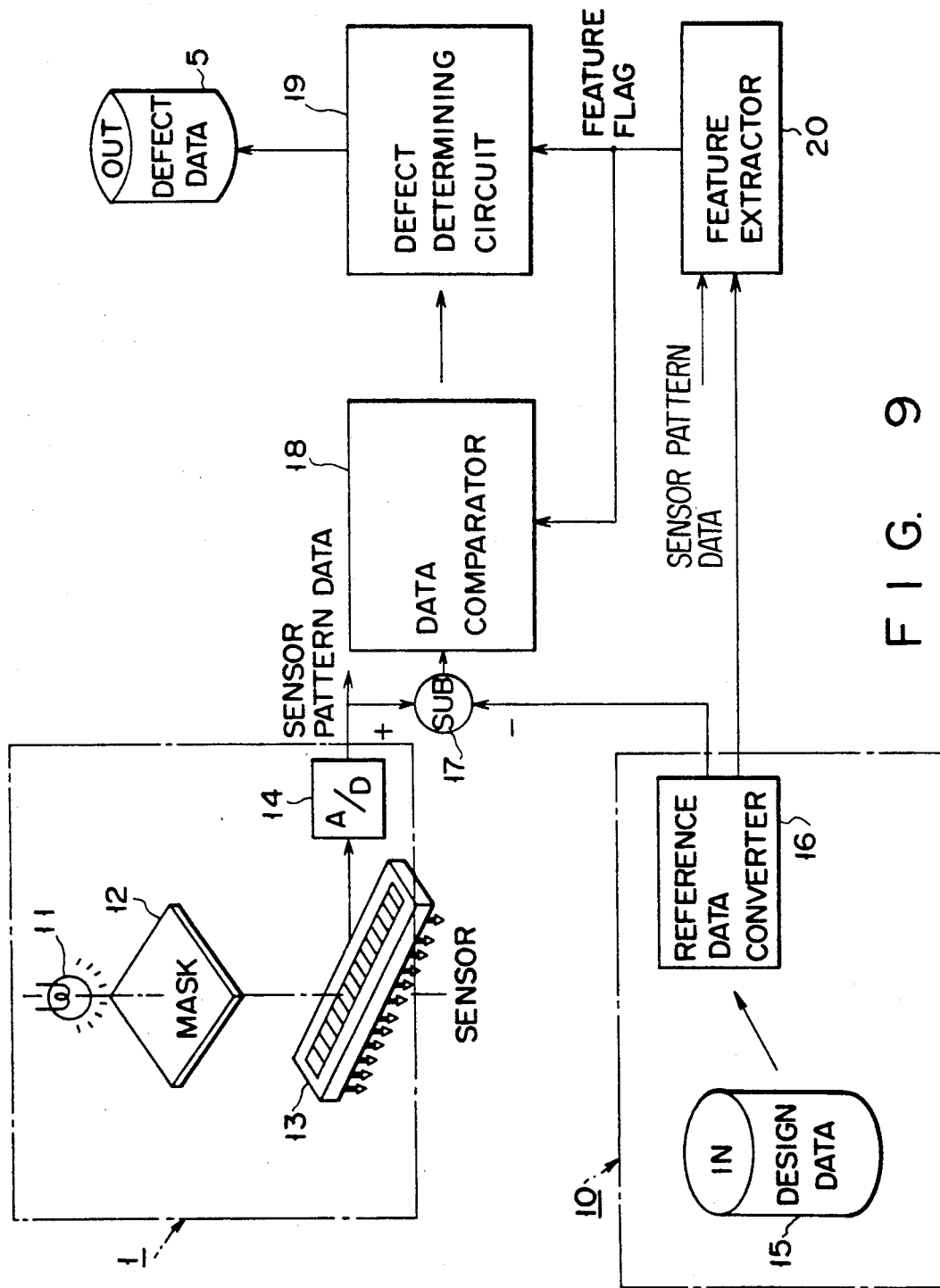
FIG. 9 is a schematic representation of a pattern inspection system according to the other embodiment of the present invention.

FIG. 9 is a schematic representation of a pattern inspection apparatus according to the other embodiment of the present invention. In FIG. 9, like reference characters are used to denote corresponding parts to those of FIG. 2 and detailed descriptions thereof are omitted. In this embodiment, a feature extraction section 20 is added to the first embodiment described previously. The feature extraction section 20 is connected to the A/D converter 14, the data converter 16, the comparator 18 and the defect determining circuit 19. The comparator 18 performs a determining process using information related to the feature of a pattern (feature flag) which is obtained by the feature extraction section 20. The defect determining section 19 reconsiders the results of comparison by the comparator 18 to perform a defect determining process. That is, the second embodiment is, as a whole, characterized by being equivalent to varying the algorithm for compare determination in the first embodiment.

More specifically, the second embodiment differs from the first embodiment in the following two points.

First, the spatial differentiation filtering is performed in the orthogonal two directions and only the minimum values are used to determine the presence or absence of defects.

Second, the feature extraction section 20 is provided to vary the thresholds in the defect determining circuit 19. That is, on the basis of data converted by the data converter 16 the feature extraction circuit 2 extracts edges and corners of a pattern. A feature code (feature flag) is sent from the circuit 20 to the defect determining circuit 19 which varies the thresholds in the comparator according to the feature code as will be described later.

Figure 10:
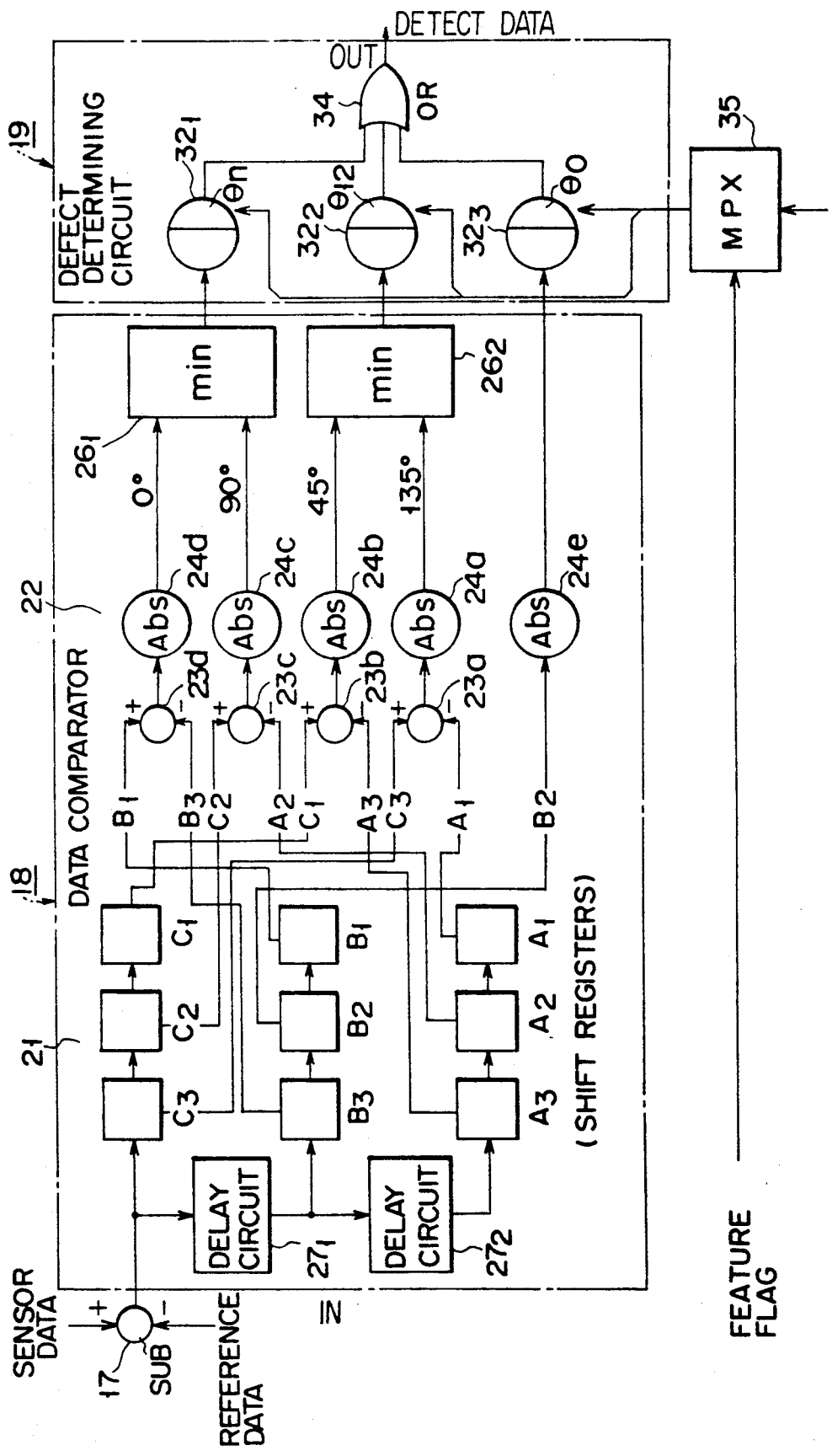
FIG. 10 illustrates specific arrangements of the comparator and the defect decision circuit of FIG. 9.

FIG. 10 illustrates, in block form specific arrangements of the comparator 19 and defect determining circuit 19 of FIG. 9.

The comparator 18 is constructed from a shift register 21 having 3×3 cells, delay circuits 271 and 272 and a spatial differentiation filter 22. The spatial differentiation filter 22 performs a filtering process in the orthogonal directions, which is the first feature of the present embodiment, and is constructed from four subtracters 23a, 23b, 23c and 23d, absolute value detectors 24a, 24b, 24c, 24d and 24e and minimum detectors 261 and 262.

The defect determining circuit 19 is constructed from three comparators 321, 322 and 323, an OR gate 34 and a multiplexer 35. Of the cells A1 to A3, B1 to B3 and C1 to C3, the cells B1 and B3, cells C2 and A2, cells C1 and A3 and cells C3 and A1 are coupled to the subtracters 23d, 23c, 23b and 23a, respectively, to obtain their respective differences between data and the differences are then applied to the absolute value circuits 24d, 24c, 24b and 24a, respectively, to obtain their respective absolute values. In other words, the cells are subjected to spatial differentiation in the four directions of 0°, 90°, 45° and 135° and then the absolute values are obtained. For example, for differentiation filtering in the 0° direction, the difference between B1 and B3 is taken. Moreover, the minimum of the absolute values of the differentiated values in the orthogonal two directions (the 0° and 90° directions; 45° and 135° directions) is taken and it is determined, when at least one of the absolute values of the density difference and the minimum exceeds its corresponding threshold, that there is a defect.

The thresholds ($\theta 11$, $\theta 12$) are switched by the multiplexer 35 which responds to a feature code extracted by the feature extracting circuit 20 and then applied to the defect determining circuit. Specifically, when an area being inspected is an edge, $\theta 11$ is set low and $\theta 12$ is set high, while, when a corner is being inspected, $\theta 12$ is set low and $\theta 11$ is set high.

Figure 11:
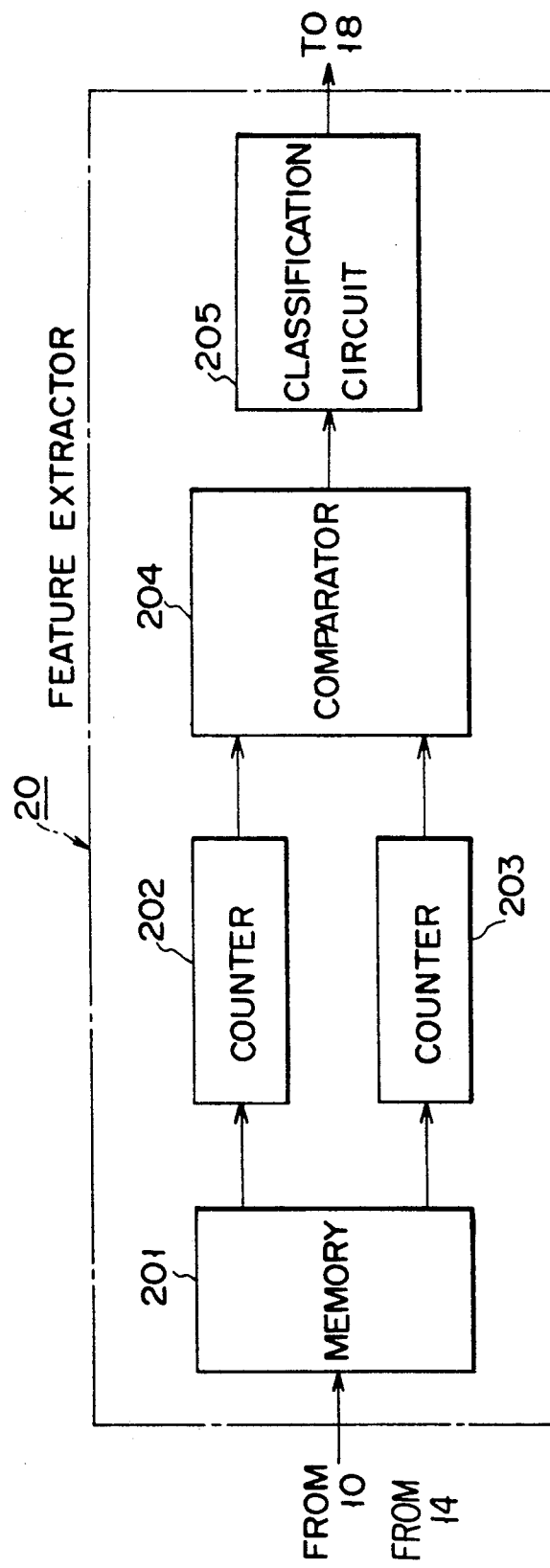
FIG. 11 illustrates a specific arrangement of the pattern feature extractor of FIG. 10.

FIG. 11 is a block diagram of the feature extraction section.

The feature extraction section 20 is constructed from a memory 201, counters 202 and 203, a comparator 204 and a classification circuit 205. The design data is cut out into a rectangular window region and then entered into the feature extraction section 20. The data for the windows region is stored in the memory 201 and divided into plural (two) subregions for application to the counters 202 and 203. The sum of gray levels of picture elements contained in each of the subregions is calculated by a respective one of the counters 202 and 203. The design data may be divided into concentric ring-like subregions each having a constant width along its circumference. The outputs of the counters 20 and 203 are applied to the comparator 204 where the difference between the outputs of the counters is calculated. The output of the comparator 204 is applied to the classification circuit 205 which classifies patterns and extracts their features.

Figure 12A:
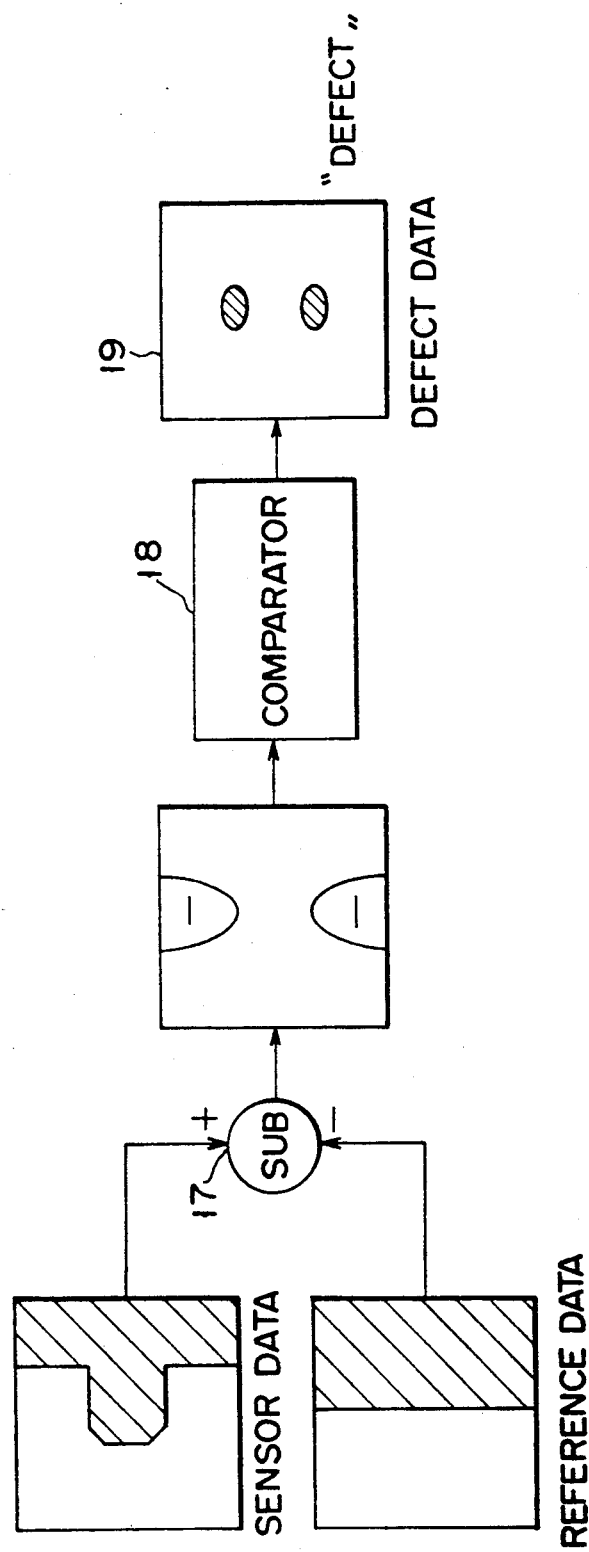

FIGS. 12A and 12B illustrate the mode of detecting defects in the present embodiment. When a defect is contained in an inspected pattern as shown in FIG. 12A, information corresponding to the defect will be contained in the density difference data obtained through the subtracter 17. For this reason, it is determined that a defect exists.

If, on the other hand, the inspected pattern contains misregistration as shown in FIG. 12B, information corresponding to the misregistration will be contained in the data (density difference) from the subtracter 17. However, the minimum data obtained by transmitting the density difference data through the spatial differentiation filter contains no information corresponding to the defect. Thus, it will be determined that there is no defect. Thereby, only true defects can be detected efficiently without false defect detection due to misregistration.

The present invention is not limited to the embodiments described above. An actual pattern (inspected pattern) drawn on a mask may be rounded at its corners and thus slightly differ from a design pattern. By the conventional type of pattern inspection system, the difference will be suspected as a defect factor, though the circuit activity of the actual semiconductor device is still normal, and the difference is in an allowable range. In order to neglect the difference between the actual pattern and the design pattern, it is required that the feature of the circuit pattern be obtained previously and the thresholds of the defect determining circuit be varied accordingly. Pattern features may be classified by, for example, as shown in FIG. 13A, cutting a rectangular window region (not limited to a rectangular shape) from design data, dividing the window region into a plurality of subregions and obtaining the difference in the sum of gray levels between the subregions.

The spatial differentiation filter need not be limited to that of FIG. 2. It may suitably be modified according to specifications. The filtering directions are not limited to four directions. They may be two directions along vertical and horizontal lines of a circuit pattern.

The present invention thus permits only defects to be detected without causing false detection due to misregistration between an inspected pattern and a reference pattern.

Figure 13A:
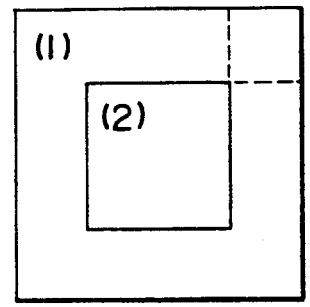
FIGS. 13A to 13C illustrate examples of region division of a circuit pattern in a pattern feature extracting process.
Figure 13B:
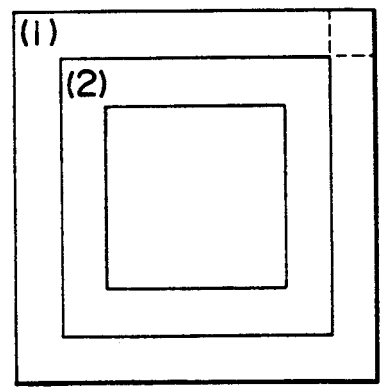
Figure 13C:
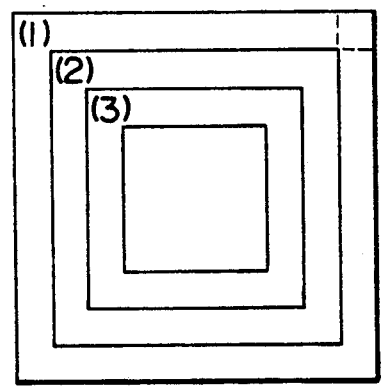

The division region of a region set by a window region dividing process in the feature extraction section 20 is rectangular as shown in FIGS. 13A to 13C and set according to the size of a picture element. In FIGS. 13A to 13C, numerals enclosed in parentheses indicate divided window regions.

In the example of FIG. 13A, a rectangular window region is divided into two rectangular ring-like subregions (1) and (2). In each of the subregions, the sum of gray levels is obtained. In order to obtain the sum of gray levels of variable density image (dot image) which is formed of binary digits each representing a 1 or a 0 like a circuit pattern, it is necessary only to count 1s contained in a ring-like region. The difference in the number of 1s between the ring-like regions (1) and (2) is calculated, whereby the pattern feature is classified.

In the example of FIG. 13B, the rectangular region is divided into two ring-like regions (1) and 2) and then the sum of gray levels of picture elements in each of the ring-like regions is obtained. Moreover, as is the case with the previous example, the difference in the sum of gray levels between the two regions is obtained, thus permitting the pattern feature to be classified.

Next, the method of extracting a pattern feature in the example of FIG. 13B will be described in more detail by referring to FIGS. 14A through 14G. In FIGS. 14A through 14G, a portion indicated by hatching is a region representing a certain type of pattern. By obtaining the difference between the sum of the gray levels in the ring-like region (1) and the sum of the gray levels in the ring-like region (2), it will be appreciated that the types of 45°, 90°, 135°, 180°, 225°, 270° and 315° edges or corners can be classified into seven integers 1 to 7. Moreover, it will be appreciated that the result of the difference remains unchanged even if the parallel displacement or rotary displacement of the pattern occurs in each of the cases of FIGS. 14A through 14G. Therefore, pattern features can be classified by the difference result ((1)-(2)), not by the pattern parallel displacement or rotary displacement as in the prior art.

In the example of FIG. 13C, the rectangular region is divided into three ring-like regions (1), (2) and (3) and then the sum of gray levels in each of the regions is obtained. The counts S1, S2 and S3 of black picture elements contained in the ring-like regions (1), (2) and (3) are input to the classification section 205 of FIG. 11. The classification circuit 205 may consist of a computer program or a digital circuit. Its logic may be set in accordance with the following rules <1> to <3>.

<1> When S3 equal to 0,
  a flag is set to indicate an all-white pattern (the flag is set on).
When S3 equals to the size of the ring-like region (3),
  a flag is set to indicate an all-back pattern (the flag is set on).
<2> When S1−S2 equals S2−S3,
  the difference is output.
<3> When the maximum of S1-S2 and S2-S3 is 4 or below,
  the maximum is output.
When the minimum of S1−S2 and S2−S3 is 4 or above,
  the minimum is output.

Figure 15A:
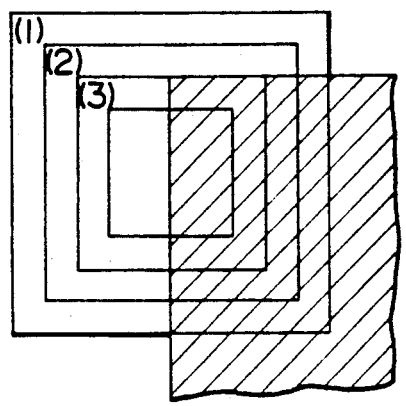
FIGS. 15A and 15B are diagrams for use in explanation of the effect of the pattern feature extraction when the circuit pattern is divided into three ring-like regions.
Figure 15B:
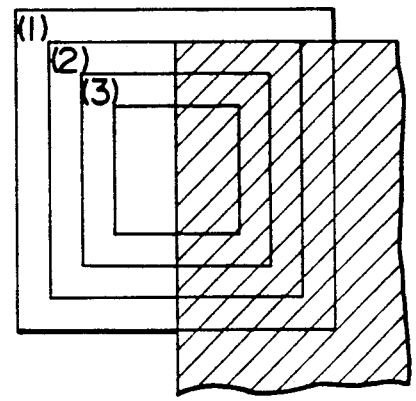

FIGS. 15A and 15B illustrate one example of the effect of the above rule <3>.

When the 90° corner is located on the boundary between the ring-like regions (2) and (3) as in FIG. 15A, S1−S2 and S2−S3 indicate no equality. In such a case, suitable classification is made possible by the above rule.

That is, the case of FIG. 15A will be represented as follows.

Since S1=12, S2=10 and S3=10, S1−S2=2 and S2−S3=0.

According to the rule <3>, the output will be the maximum, 2.

The case of FIG. 15B will be represented as follows.

Since S1=13, S2=14 and S3=10,
S1−S2=−1 and S2−S3=4.

According to the rule <3>, the output will be the maximum, 4.

According to the present embodiment, as described above, by dividing a rectangular window region into, for example, two concentric ring-like regions along its outer circumference and obtaining the difference in the sum of gray levels between the ring-like regions, it becomes possible to determine a pattern feature, such as an edge or corner, without utilizing the parallel displacement or rotary displacement of a circuit pattern as in the prior art.

Accordingly, by using the pattern feature for compare determination so as to change the algorithm for defect inspection (for example, resetting processing parameters), it becomes possible to perform efficient defect detection with the pattern feature added. Unlike the conventional template matching method, the difference in the sum of gray levels between the ring-like regions has only to be obtained. Thus, the time required for arithmetic processing can be decreased considerably and the feature extraction can be performed at a high speed. This permits the feature extraction and the pattern defect inspection to be performed concurrently.

The present invention need not be limited to the above embodiments. For example, the ring-like regions are not limited in number up to three and may, of course, be increased to four or more. Moreover, the window region to be cut is not limited to a rectangular shape and may alternately be a polygon or a circle.

In addition, data used for pattern extraction is not limited to design data and may be two-dimensional image data which is obtained by taking the image of a pattern. Such data can be utilized in making a comparison between adjacent identical patterns as in the die to die comparison method.

According to the present invention, as described in detail above, by taking the sum of gray levels in each of window (ring-like) regions into which a circuit pattern is divided and obtaining the difference in the sum of gray levels between the window regions, a pattern feature such as an edge or corner can be determined without using the parallel displacement or rotary displacement of the circuit pattern. Therefore, the pattern feature extraction can be performed by simple arithmetic processing and at a high speed. This can improves the efficiency of pattern defect detection.

The present invention may be embodied in still other ways without departing from the spirit thereof.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A pattern inspection system comprising:
   first means for inputting a two-dimensional inspected pattern as image data having a multi-valued density distribution;
   second means for inputting data on a reference pattern corresponding to said inspected pattern;
   density difference obtaining means coupled to said first means and said second means for making a comparison between said image data and said reference data and thereby obtaining the difference in density between said inspected pattern and said reference pattern;
   filter means for performing spatial differential on the distribution of the density difference between said inspected pattern and said reference pattern in different directions;
   absolute value obtaining means for taking absolute values of computational results by said filter means and obtaining the minimum of the absolute values;
   defect detecting means for detecting a defect of said inspected pattern on the basis of a comparison between the minimum obtained by said absolute value obtaining means and a threshold; and
   defect data outputting means for outputting defect data output from said defect detecting means;
   wherein said defect means detects the feature of said reference pattern data and varies the threshold for the minimum on the basis of the detected feature and determines, when the minimum exceeds its threshold, that there is a defect.

2. A pattern inspection system comprising:
   first means for inputting a two-dimensional inspected pattern as image data having a multi-valued density distribution;
   second means for inputting data on a reference pattern corresponding to said inspected pattern;
   density difference obtaining means coupled to said first means and said second means for making a comparison between said image data and said reference data and thereby obtaining the difference in density between said inspected pattern and said reference pattern;
   filter means for performing spatial differentiation on the distribution of the density difference between said inspected pattern and said reference pattern in different directions;
   absolute value obtaining means for taking absolute values of computational results by said filter means and obtaining the minimum of the absolute values;
   defect detecting means for detecting a defect of said inspected pattern on the basis of a comparison between the minimum obtained by said absolute value obtaining means and a threshold;
   defect data outputting means for outputting defect data output from said defect detecting means; and
   pattern feature extracting means which comprises storage means for storing a window region of a predetermined shape cut from design data for producing a pattern or image data obtained by taking the image of a pattern, calculating means for dividing the window region stored in said storage means into plural subregions and calculating the sum of gray levels in density of picture elements contained in each of said subregions, means for making a comparison between said subregions in the sum of gray levels and means for classifying the pattern feature of said window region on the basis of the compared results by said comparing means.

3. A pattern inspection system comprising:
   first means for inputting a two-dimensional inspected pattern as image data having a multi-valued density distribution;
   second means for inputting data on a reference pattern corresponding to said inspected pattern;
   density difference obtaining means coupled to said first means and said second means for making a comparison between said image data and said reference data and thereby obtaining the difference in density between said inspected pattern and said reference pattern;
   filter means for performing spatial differentiation on the distribution of the density difference between said inspected pattern and said reference pattern in different directions;
   absolute value obtaining means for taking absolute values of computational results by said filter means and obtaining the minimum of the absolute values;
   defect detecting means for detecting a defect of said inspected pattern on the basis of a comparison between the minimum obtained by said absolute value obtaining means and a threshold;
   defect data outputting means for outputting defect data output from said defect detecting means; and
   pattern feature extracting means which comprises storage means for storing a window region of a predetermined shape cut from design data for producing a pattern or image data obtained by taking the image of a pattern, calculating means for dividing the window region stored in said storage means into plural concentric ring-like subregions each having a constant width along the external circumference of the window region and calculating the sum of gray levels in density of picture elements contained in each of said subregions, means for obtaining the difference in the sum of gray levels between the nth (n is an integer of 1 or more) subregion and the (n+1)st subregion from the outermost subregion and means for classifying the pattern feature of the window region on the basis of the difference obtained by said means for obtaining the difference.

4. A pattern inspection system comprising:
   first means for inputting a data item representing a subject pattern to be inspected;

second input means for inputting a data item representing a reference pattern which corresponds to the subject pattern;

data-comparing means connected to said first input means and said second input means, for comparing the data item representing the subject pattern, with the data item representing the reference pattern, thereby to output a data item representing a difference between the data items thus compared;

defect detecting means for detecting a defect of the data item representing said subject pattern, by processing the data item output by said data comprising means in accordance with a predetermined inspection algorithm;

memory means for storing data representing a window region cut from the subject pattern or the reference pattern and having a predetermined shape;

calculating means for dividing the window region into a plurality of sub-regions and for calculating a sum of gray levels of pixels existing in each of the sub-regions;

comparing means for comparing the sum of gray levels for each sub-region, with the sum of gray levels for any other sub-region, thereby to output data representing a difference between the sums of gray levels thus compared;

pattern-classifying means for classifying a pattern in the window region in accordance with the data output by said comparing means; and algorithm-altering means for altering the predetermined inspection algorithm, in accordance with the feature of the pattern classified by said pattern-classifying means.

5. A pattern inspection system comprising:

first input means for inputting a data item representing a subject pattern to be inspected;

second input means for inputting a data item representing a reference pattern which corresponds to the subject pattern;

data-comparing means connected to said first input means and said second input means, for comparing the data item representing the subject pattern, with the data item representing the reference pattern, thereby to output a data item representing a difference between the data item thus compared;

defect detecting means for detecting a defect of the data item representing said subject pattern, by processing the data item output by said data-comparing means in accordance with a predetermined inspection algorithm;

memory means for storing data representing a window region cut from the subject pattern or the reference pattern and having a predetermined shape;

calculating means for dividing an annular region surrounding the window region, into a plurality of concentric annular sub-regions having the same width, and for calculating a sum of gray levels of pixels existing in each of the sub-regions;

comparing means for comparing the sum of gray levels for the nth sub-region, counted from the outermost sub-region, with the sum of gray levels for the (n+1)th annular sub-region, where n is one or a greater integer, thereby to output data representing a difference between the sums of gray levels thus compared;

pattern-classifying means for classifying a pattern in the window region in accordance with the data output by said comparing means; and algorithm-altering means for altering the predetermined detection algorithm, in accordance with the feature of the pattern classified by said pattern-classifying means.

6. A pattern inspection system according to claim 4, in which each of the design data and the image data is formed of binary information comprised of 0s and 1s, and in which said calculating means for calculating a sum of gray levels calculates the number of 0s and 1s contained in each of the subregions.

7. A pattern inspection system according to claim 5, further comprising pattern feature extracting means for obtaining the difference in a sum of gray levels between (n+1)st and (n+2)nd subregions in addition to the difference in a sum of gray levels between the nth and (n+1)st subregions where n is an integer of 1 or more.

8. A pattern inspection system according to claim 7, further comprising pattern feature extracting means which outputs to said data comparison means data representing the feature of a pattern and based o the following processes (a), (b) and (c):

assuming the sum of gray levels of the nth (n is an integer of 1 or more) ring-like subregion to be Sn, (a) when $S_{N+2}=0$, a flag is set to indicate an all-white pattern;

when $S_{N+2}$ equals the size of the (n+2)nd ring-like subregion, a flag is set to indicate an all-black pattern;

(b) when $S_N - S_{N+1} = S_{N+1} - S_{N+2}$, this value itself is output;

(c) when the maximum of $S_N - S_{N+1}$ and $S_{N+1} - S_{N+2}$ is 4 or below, the maximum is output;

when the minimum of $S_N - S_{N+1}$ and $S_{N+1} - S_{N+2}$ is 4 or above, the minimum is output.

9. A pattern inspection system comprising:

first means for inputting a two-dimensional inspected pattern as image data having a multivalued density distribution;

second means for inputting data on a reference pattern corresponding to said inspected pattern;

density difference obtaining means, coupled to said first means and second means, for making a comparison between said image data and said reference data and thereby obtaining the difference in density between said inspected pattern and said reference pattern;

filter means for performing spatial differentiation on the distribution of the density difference between said inspected pattern and said reference pattern in different direction;

absolute value obtaining means for taking absolute values of computational results by said filter means and obtaining the minimum and maximum of the absolute values;

defect detecting means for detecting a defect on the basis of the density differences, the minimum and the maximum obtained by said absolute value obtaining means;

defect data outputting means for outputting defect data output from said defect detecting means; and pattern feature extracting means which comprises storage means for storing a window region of a predetermined shape cut from design data for producing a pattern or image obtained by taking the image of a pattern, calculating means for dividing the window region stored in said storage means into plural subregions and calculating the sum of gray levels in density of picture elements contained in each of subregions, means for making a comparison between said subregions in the sum of gray levels and means for classifying the pattern feature of said window region on the basis of the compared results of said comparing means.

10. A pattern inspection system comprising:

first means for inputting a two-dimensional inspected pattern as image data having a multi-valued density distribution;

second means for inputting data on a reference pattern corresponding to said inspected pattern;

density difference obtaining means coupled to said first means and said second means for making a comparison between said image data and said reference data and thereby obtaining the difference in density between said inspected pattern and said reference pattern;

filter means for performing spatial differential on the distribution of the density difference between said inspected pattern and said reference pattern in different directions;

absolute value obtaining means for taking absolute values of computational results by said filter means and obtaining the minimum of the absolute values;

defect detecting means for detecting a defect of said inspected pattern on the basis of a comparison between the minimum obtained by said absolute value obtaining means and a threshold; and defect data outputting means for outputting defect data output from said defect detecting means;

pattern feature extracting means which comprises storage means for storing a window region of a predetermined shape cut from design data for producing a pattern or image data obtained by taking the image of a pattern, calculating means for dividing the window region stored in said storage means into plural concentric ring-like subregions each having a constant width along the external circumference of the window region and calculating the sum of gray levels in density of picture elements contained in each of said subregions, means for obtaining the difference in the sum of gray levels between the nth (n is an integer of 1 or more) subregion and the (n+1)st subregion from the outermost subregion and means for classifying the pattern feature of the window region on the basis of the difference obtained by said means for obtaining the difference.

* * * * *